(12) United States Patent
Pucher (10) Patent No.: US 8,978,548 B2
(45) Date of Patent: Mar. 17, 2015

(54) KITCHEN APPLIANCE

(75) Inventor: Herfried Pucher, Klagenfurt (AT)

(73) Assignee: Koninklijke Philips N.V., Eindhoven (NL)

( * ) Notice: Subject to any disclaimer, the term of this patent is extended or adjusted under 35 U.S.C. 154(b) by 217 days.

(21) Appl. No.: 13/264,389

(22) PCT Filed: Apr. 28, 2010

(86) PCT No.: PCT/IB2010/051852
§ 371 (c)(1),
(2), (4) Date: Oct. 14, 2011

(87) PCT Pub. No.: WO2010/128430
PCT Pub. Date: Nov. 11, 2010

(65) Prior Publication Data
US 2012/0031285 A1   Feb. 9, 2012

(30) Foreign Application Priority Data
May 8, 2009 (EP) .................................. 09159738

(51) Int. Cl.
*B02C 25/00* (2006.01)
*A47J 19/02* (2006.01)

(52) U.S. Cl.
CPC ..................... *A47J 19/027* (2013.01)
USPC ................. 99/486; 99/513; 99/512

(58) Field of Classification Search
CPC ......... A23N 1/00; A23N 1/003; A47J 19/027; A47J 19/06
USPC ............ 99/513, 512, 511, 510; 366/184, 185, 366/189
See application file for complete search history.

(56) References Cited

U.S. PATENT DOCUMENTS

| | | | | |
|---|---|---|---|---|
| 1,454,918 A | * | 5/1923 | Brophy | 99/503 |
| 1,634,774 A | * | 7/1927 | Enssle | 99/502 |
| 1,662,898 A | * | 3/1928 | Pursell | 99/513 |
| 1,797,190 A | * | 3/1931 | Gilbert | 99/501 |

(Continued)

FOREIGN PATENT DOCUMENTS

| | | | | |
|---|---|---|---|---|
| GB | 2041727 A | | 9/1980 | |
| GB | 2470002 A | * | 11/2010 | A47J 19/02 |

(Continued)

OTHER PUBLICATIONS

Wikipedia, File:Shisendo Souzu.jpg, Apr. 17, 2005 [online], [retrieved on Jul. 9, 2013]. Retrieved from the Internet <http://en.wikipedia.org/wiki/Shishi-odoshi>.*

*Primary Examiner* — Henry Yuen
*Assistant Examiner* — Jimmy Chou (57) ABSTRACT

A kitchen appliance (1) for processing foodstuff comprises housing (3) surrounding a cavity (4) for receiving said foodstuff. The appliance further comprises an outlet (25) for dispensing pourable foodstuff from the housing (3) and a collector (22) to receive and collect pourable foodstuff and delivering the pourable foodstuff to the outlet (25). The outlet (25) has a spout (5), said spout (5) being hingeable about a substantially horizontal axis (23) between a first position in which the pourable foodstuff can be dispensed from the spout (5) and a second position in which dispensing of the pourable foodstuff from the spout (5) is prevented. Said spout (5) is constructed and arranged to be manipulated by a manipulator acting on the spout (5) so as to urge the spout (5) towards the second position.

8 Claims, 5 Drawing Sheets

(56) References Cited

U.S. PATENT DOCUMENTS

| | | | | |
|---|---|---|---|---|
| 1,886,092 A * | 11/1932 | Graham | | 99/503 |
| 2,114,425 A * | 4/1938 | Kagley | | 99/490 |
| 2,214,168 A * | 9/1940 | Kinnison et al. | | 99/562 |
| 2,363,798 A * | 11/1944 | McCulloch | | 100/98 R |
| 2,369,406 A * | 2/1945 | Reynolds | | 99/511 |
| 2,409,497 A * | 10/1946 | Kessel | | 99/511 |
| 2,440,425 A * | 4/1948 | Williams | | 99/503 |
| 2,513,519 A * | 7/1950 | Reynolds | | 99/511 |
| 2,590,237 A * | 3/1952 | Doering | | 99/503 |
| 2,840,130 A * | 6/1958 | Schwarz | | 99/511 |
| 2,845,971 A * | 8/1958 | Corder | | 99/512 |
| 3,086,448 A * | 4/1963 | Forman | | 99/425 |
| 3,122,188 A * | 2/1964 | Curtis | | 99/492 |
| 3,186,458 A * | 6/1965 | Takei et al. | | 99/512 |
| 3,889,875 A * | 6/1975 | Goodhouse | | 235/61 A |
| 4,345,517 A * | 8/1982 | Arao et al. | | 99/511 |
| 4,506,601 A * | 3/1985 | Ramirez et al. | | 99/511 |
| 4,667,587 A * | 5/1987 | Wunder | | 99/295 |
| 4,716,823 A * | 1/1988 | Capdevila | | 99/510 |
| 4,893,552 A | 1/1990 | Wunder et al. | | |
| 5,133,247 A * | 7/1992 | Pastrick | | 99/295 |
| 5,231,763 A * | 8/1993 | Laux | | 30/250 |
| 5,257,575 A * | 11/1993 | Harrison et al. | | 99/511 |
| 5,355,784 A * | 10/1994 | Franklin et al. | | 99/492 |
| 5,406,882 A * | 4/1995 | Shaanan | | 99/287 |
| 5,417,152 A * | 5/1995 | Harrison | | 99/492 |
| 5,421,248 A * | 6/1995 | Hsu | | 99/512 |
| 5,495,795 A * | 3/1996 | Harrison et al. | | 99/492 |
| 5,526,570 A * | 6/1996 | Beetz et al. | | 30/250 |
| 5,549,227 A * | 8/1996 | Klotz | | 222/461 |
| 5,743,176 A * | 4/1998 | Anderson et al. | | 99/512 |
| 5,761,993 A * | 6/1998 | Ling et al. | | 99/510 |
| 5,784,954 A * | 7/1998 | Kokot et al. | | 99/511 |
| 5,862,739 A * | 1/1999 | Lin | | 99/285 |
| 6,185,906 B1 * | 2/2001 | Mogard et al. | | 53/410 |
| 6,324,967 B1 * | 12/2001 | Robinson | | 99/297 |
| 6,397,736 B1 * | 6/2002 | Tseng et al. | | 99/511 |
| 6,405,638 B1 * | 6/2002 | Chen | | 99/318 |
| 6,412,404 B1 * | 7/2002 | Hsu | | 99/495 |
| 6,901,849 B1 * | 6/2005 | Cohen et al. | | 99/511 |
| 7,040,220 B1 * | 5/2006 | Cohen et al. | | 99/511 |
| 7,056,371 B2 * | 6/2006 | Mossberg et al. | | 96/205 |
| 7,066,082 B2 * | 6/2006 | O'Loughlin | | 99/511 |
| 7,431,851 B2 * | 10/2008 | Chan | | 210/800 |
| 7,472,646 B2 * | 1/2009 | Mazej et al. | | 99/492 |
| 7,481,155 B2 * | 1/2009 | Larsen | | 99/511 |
| 8,074,561 B2 * | 12/2011 | Galbis | | 99/297 |
| 8,091,473 B2 * | 1/2012 | Kim | | 99/510 |
| 8,146,490 B2 * | 4/2012 | Obersteiner et al. | | 99/510 |
| 8,210,101 B2 * | 7/2012 | Wu Chang | | 99/510 |
| 8,316,762 B2 * | 11/2012 | Peng | | 99/513 |
| 8,365,657 B2 * | 2/2013 | Lee | | 99/509 |
| 8,387,520 B2 * | 3/2013 | Backus | | 99/512 |
| 8,474,375 B2 * | 7/2013 | Jays et al. | | 100/104 |
| 2003/0052206 A1 * | 3/2003 | Fouquet | | 241/92 |
| 2006/0027107 A1 * | 2/2006 | Lin | | 99/511 |
| 2006/0086261 A1 * | 4/2006 | Cohen et al. | | 99/511 |
| 2006/0191425 A1 * | 8/2006 | Chang | | 99/511 |
| 2007/0056450 A1 * | 3/2007 | Hensel | | 99/495 |
| 2007/0089615 A1 * | 4/2007 | Wu Chang | | 99/511 |
| 2007/0125244 A1 * | 6/2007 | Hensel | | 99/501 |
| 2008/0115677 A1 * | 5/2008 | Tseng et al. | | 99/510 |
| 2009/0049998 A1 * | 2/2009 | Kim | | 99/510 |
| 2009/0235831 A1 * | 9/2009 | Nisonov | | 100/112 |
| 2010/0050886 A1 * | 3/2010 | Obersteiner et al. | | 99/507 |
| 2011/0083565 A1 * | 4/2011 | Backus | | 99/511 |
| 2011/0083566 A1 * | 4/2011 | Backus | | 99/511 |
| 2011/0185921 A1 * | 8/2011 | Lee | | 99/513 |

FOREIGN PATENT DOCUMENTS

| | | | |
|---|---|---|---|
| JP | 2007269443 A | * | 10/2007 |
| WO | 03020092 A1 | | 3/2003 |
| WO | 2009010897 A2 | | 1/2009 |

\* cited by examiner

KITCHEN APPLIANCE

FIELD OF THE INVENTION

The present invention relates to a kitchen appliance, a jug designed to co-operate with a kitchen appliance and an assembly of a kitchen appliance and a jug. In particular the invention relates to a kitchen appliance known as a juice extractor which is provided with means to prevent drops of juice to reach a support surface of the kitchen appliance.

BACKGROUND OF THE INVENTION

Kitchen appliances which are used to process foodstuff can be found in many kitchens of both families, restaurants etcetera. A particular type of kitchen appliance used in processing foodstuff is designed to process foodstuff such, that a pourable or liquidized foodstuff is obtained. Such kitchen appliances are for example mixers, blenders and juice extractors. Such devices are widely known and are for example used to extract the juice present in fruit or vegetables, or to blend certain foodstuffs so that people may enjoy the consummation of such foodstuff including all the good vitamins and nutritious contents of the fruit or vegetables in an easy manner. Normally the resulting pourable foodstuff, such as fruit or vegetable juice for example, will be supplied to a jug or a drinking glass.

A concern of such kitchen appliances is that often the outlets thereof will continue to drip after the jug or glass has been removed, i.e. is no longer positioned close to the outlet. This produces drops of liquid, i.e. pourable foodstuff, on the support surface on which the kitchen appliance is located. The support surface, for example a table top, will need to be cleaned in order to avoid sticky patches of semi-dried liquid to be present. This is considered troublesome for many users.

In order to address this concern, a kitchen appliance, in particular a juice extractor has been proposed in WO2009/010897 that has an arrangement that is designed to prevent dripping of juice from the juice extractor. The known juice extractor comprises an outlet with a spout for dispensing the juice from the juice extractor, wherein the spout is configured to receive a rotable and crooked, i.e. elbow-shaped tube that can be rotated about the longitudinal axis of the spout over 180 degrees. In this manner the crooked tube, or in principle the spout it is an extension of, can be positioned in two position. One position in which the tube is rotated upwards and in which dispensing of juice from the juice extractor is prevented and one position in which the tube is rotated downwards and in which dispensing of the juice is possible. In the position in which the tube is rotated upwards, dripping of juice from the tube, and thus from the spout, is prevented. The tube needs to be rotated manually.

Although the solution of WO 2009/010897 provides a solution to the above-mentioned concern, it may still be considered troublesome by some users to rotate the tube manually, which requires some substantial rotation, i.e. over 180 degrees. This is in particularly true for people who have reduced movement or capability of movement in their hands or arms. As a further concern it can be noted that the spout of the known juice extractor needs to be rotated while the jug is still located beneath the spout. In case the jug is removed prior to rotation of the spout, there is still a considerable risk of drops of foodstuff reaching the support surface.

OBJECT OF THE INVENTION

It would therefore be desirable to provide a kitchen appliance that further reduces the possibility of foodstuff dripping on the support surface, while being easy to operate. In any case it would be desirable to provide an alternative for the juice extractor known from WO 2009/010897.

SUMMARY OF THE INVENTION

To better address one or more of these concerns, a kitchen appliance for processing foodstuff is provided that comprises a housing surrounding a cavity for receiving said foodstuff, an outlet for dispensing pourable foodstuff from the housing and a collector to receive and collect pourable foodstuff and delivering the pourable foodstuff to the outlet. The outlet is provided with a spout, the spout being hingeable about a substantially horizontal axis between a first position in which the pourable foodstuff can be dispensed from the spout and a second position in which dispensing of the pourable foodstuff from the spout is prevented. The spout of the kitchen appliance is constructed and arranged to be manipulated by a manipulator that can act on the spout so as to urge the spout towards the second position.

By providing that the spout of the juice extractor can hinge about a substantially horizontal axis it is achieved that the spout can move between said first and second positions in a substantially vertical direction. In this manner, instead of rotating the spout or tube as proposed in WO 2009/010897 a simple movement in vertical direction suffices to move the spout between the two positions. This is a much simpler movement than rotation. Furthermore, by providing a spout that can be manipulated by a manipulator that urges the spout of the kitchen appliance towards the second position, in which dispensing of the pourable foodstuff is prevented, it is achieved that a non-operable position of the spout is automatically activated. In other words, the spout will assume the second position when it is not positioned in the first position and will automatically, under the influence of the manipulator, return to the second position. Consequently, the risk of drops reaching the support surface on which the kitchen appliance is located is reduced.

In an embodiment the kitchen appliance further comprises the manipulator which comprises one or more of a spring, a counter-weight and/or a magnet. This provides a suitable and secure way of automatically returning the spout towards its second position.

In an embodiment said spout is arranged to be, at least partially, inserted into a pouring spout of a jug. This reduces the risk that dripping of drops of pourable foodstuff during pouring of the pourable foodstuff in the jug.

In an embodiment said manipulator comprises a lower guide surface of the pouring spout of the jug, which lower guide surface is arranged to contact the spout of the kitchen appliance and to urge it into said second position upon extraction of the spout of the kitchen appliance from the pouring spout of the jug. Hence, this embodiment provides a further alternative of a manipulator for urging the spout of the kitchen appliance towards the second position.

Furthermore, this provides that the movement of the spout is effected by the pouring spout of the jug. Consequently, the user does not have to actuate or manipulate the spout him- or herself. Instead displacement of the jug will bring the pouring spout into contact with the spout of the kitchen appliance and will toggle its movement. As the spout of the kitchen appliance is partially inserted into the pouring spout, the risk of dripping on the support surface is even further reduced. By providing that the spout of kitchen appliance is moved by the pouring spout of the jug an automatic movement is achieved eliminating any conscious action with respect to the movement of the spout to be taken by the user.

In an embodiment said manipulator comprises an upper guide surface of the pouring spout of the jug, which upper guide surface is arranged to contact the spout of the kitchen appliance and is arranged to urge it into said first position when the spout of the kitchen appliance is inserted, at least partially, into the pouring spout of the jug. This provides again that the movement of the spout is effected by the pouring spout of the jug, the user does not have to actuate or manipulate the spout him- or herself. Instead placement of the jug in a position in which is ready to receive foodstuff from the kitchen appliance will bring the pouring spout into contact with the spout of the kitchen appliance and will toggle its movement towards its first position automatically.

In an embodiment the spout of the kitchen appliance is angled downward with respect to the horizontal axis between 5 and 25 degrees, preferably about 15 degrees, in said first position, and is angled upward with respect to the horizontal axis between 3 and 15 degrees, preferably about 5 degrees, in said second position. These angles provide good pouring performance of the spout of the kitchen appliance and assure that no drops will reach the support surface as the spout will be angled upward sufficiently in its second position.

In an embodiment the spout of the kitchen appliance comprises a first distal which extends, at least partly, into the housing and is arranged to receive pourable foodstuff from the outlet, and comprises an open distal end which protrudes from the housing. This provides a simple and robust design of the spout which can be easily manipulated between its two positions.

In an embodiment the juice extractor further comprising a locking arrangement for locking the spout of the kitchen appliance in said positions, such that said spout remains in the position it was last in and no inadvertent movement thereof can take place. Hence, only actuation can move the spout between both positions.

In an embodiment the locking arrangement comprises a profiled surface provided on the spout of the kitchen appliance and a flexible leaf spring member arranged to co-operate with said profiled surface. This provides a secure way of locking the position of the spout while still enabling easy movement between both positions such that the kitchen appliance remains easy and comfortable to use.

In an embodiment the spout of the kitchen appliance in the second position defines a reservoir to hold excess pourable foodstuff Due to its upward orientation in the second position, the spout is able to hold some foodstuff that may come out of the collector, which may be expected in case the pourable foodstuff exhibits a relatively high viscosity.

In an embodiment the juice extractor is an electric kitchen appliance and comprises an electric drive motor, and is provided with an electric switch operated by the spout of the kitchen appliance, which switch disables operation of the kitchen appliance when the spout is in its second position. This ensures that it is not possible to operate the kitchen appliance when the jug is not in place to collect pourable foodstuff from the kitchen appliance.

The invention further relates to a jug specifically adapted to co-operate with a kitchen appliance as specified above. The invention further relates to an assembly of a kitchen appliance as specified above and a jug specifically adapted to co-operate with such a kitchen appliance It is to be noted that UK patent application GB 2 041 727 A discloses a juice extractor having an outlet spout comprising a chute, a valve member and an obturating member. GB 2 041 727 A teaches to have the outlet spout chute to be moveable between a first stable position in which the spout is closed and a second stable position in which the spout permits the flow of juice. It requires user interference to move the spout of GB 2 041 727 A between its two stable positions. In the invention as claimed in claim 1, the spout of a kitchen appliance is acted on by a manipulator urging the spout towards its position in which dispensing of the pourable foodstuff is prevented.

It is further be noted that U.S. patent application publication US 2006/086261 A1 discloses a food processor having a spout which spout is pivotally mounted to be pivoted between a blocking position wherein a part of the spout engages with a juice outlet tube to block the flow of juice from said outlet tube, and an unblocking position in which the flow of juice is possible. It requires user interference to pivot the spout of US 2006/086261 A1 between its blocked and unblocked positions. In the invention as claimed in claim 1, the spout of a kitchen appliance is acted on by a manipulator urging the spout towards its position in which dispensing of the pourable foodstuff is prevented.

It is further to be noted that international patent application WO 03/020092 A1 discloses a fruit press with a tilting collecting dish. Using a handle a user can adjust the position of the tilting collecting dish to position said dish in a position in which juice can flow from the dish and a position in which juice is blocked form flowing from the dish. It requires user interference to adjust the dish of WO 03/020092 A1 between its various positions enabling or blocked the outflow of juice. In the invention as claimed in claim 1, the spout of a kitchen appliance is acted on by a manipulator urging the spout towards its position in which dispensing of the pourable foodstuff is prevented.

BRIEF DESCRIPTION OF THE DRAWINGS

Further advantageous embodiments of the juice extractor according to the invention are described in the claims and in the following description with reference to the drawing, in which:

DETAILED DESCRIPTION OF EXAMPLES

In the below description of the invention the kitchen appliance incorporating the invention will be described in the example of a juice extractor. It is emphasized here that the invention is not limited nor intended to be limited to such a juice extractor, but is equally applicable to other kitchen appliances such as blenders, mixers and the like and even to coffee making machines and general purpose water dispensers for example. In other words, the invention is applicable to kitchen appliances that are arranged to process foodstuff and can supply pourable foodstuff, such a juice from fruit and/or vegetables, milkshakes etcetera. In other words, foodstuff that has a certain amount of liquidity.

Figure 1:
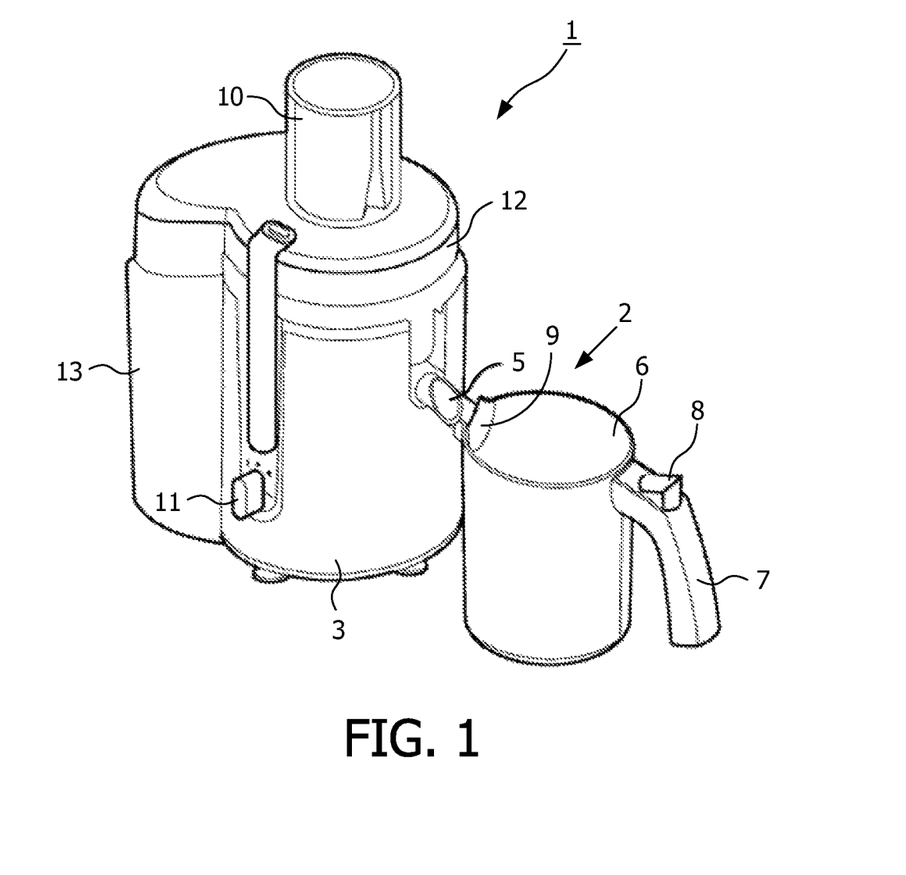
FIG. 1 shows a juice extractor and a juice jug according to the invention.

FIG. 1 shows a kitchen appliance 1, which as indicated is in the example of a juice extractor together with a jug or juice jug 2. The juice extractor 1 comprises a housing 3 which surrounds a cavity 4 (see FIG. 2). The juice extractor 1 is further provided with a spout 5, which is arranged to dispense juice from the juice extractor 1 to the jug 2. The juice jug 2 in the example of FIG. 1 is provided with a hingeable lid 6 and a handle 7. On the handle 7 an actuation knob 8 is provided that can be pressed by a user to open the lid 6. Further, the juice jug 2 comprises a pouring spout 9 that allows juice contained in the juice jug 2 to be poured, or as will be explained later, to be supplied to the juice jug 2 from the spout 5. The juice extractor 1 has a feeding tube 10 having a push member 14 (see FIG. 2) that is used to feed fruit or vegetables to the juice extractor 1. In the example shown, the juice extractor 1 is an electric juice extractor that is driven by an electric motor 21 (see FIG. 2). Hence, a power switch 11 is provided to control the juice extractor 1. Finally, the juice extractor 1 comprises a lid 12 that supports the feeding tube 10, and comprises a pulp container 13 (see FIG. 2).

Figure 2:
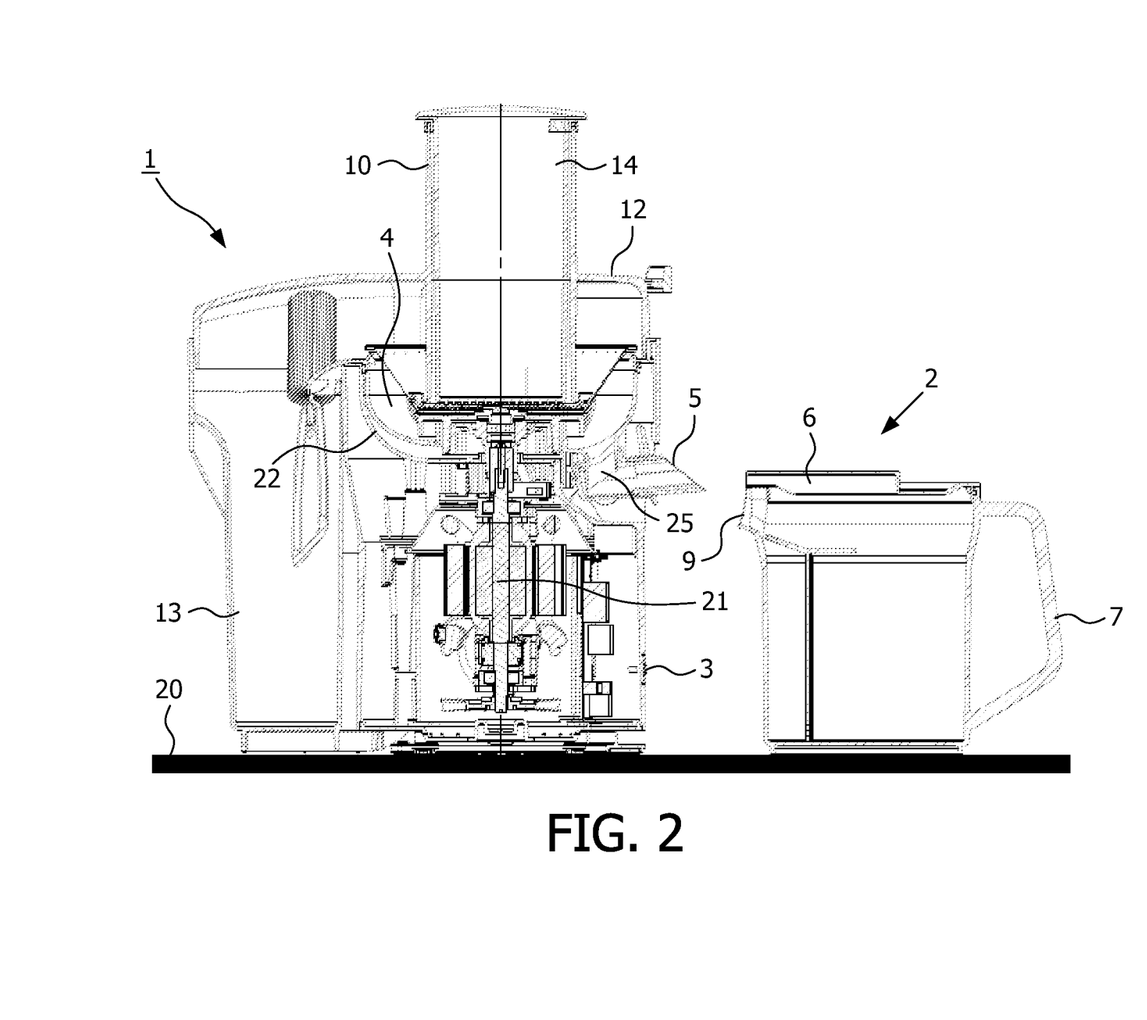
FIG. 2 shows the juice extractor and juice jug of FIG. 1 in cross-section.

FIG. 2 shows the juice extractor 1, i.e. the kitchen appliance, together with the juice jug 2 in a sectional view. Both the juice extractor 1 and the juice jug 2 are placed on a support surface 20, for example a table top or the working surface of a kitchen. The juice jug 2 shown in FIG. 2 has a closable lid 6 that must be removed by hand, as an alternative to the hingeable lid 6 as shown in FIG. 1. As can be seen in more detail in FIG. 2, the juice extractor 1 and in particular the cavity 4, that is formed by a collector 22 which is arranged to receive and collect juice. The collector 22 is provided with an outlet 25 that opens into the spout 5 which is open at an upper part thereof. As will be explained in more detail in with reference to FIGS. 3A through 5B, the spout 5 is hingeable with respect to the housing 3 and is shown in FIG. 2 in a non-operable or second position in which juice cannot de dispensed.

In order for juice (the pourable foodstuff) to be dispensed from the cavity 4 via the outlet 25 to the spout 5 and into the juice jug 2, the spout 5 of the kitchen appliance 1 needs to be manipulated such that it is able to deliver juice to the juice jug 2. As mentioned the spout 5 is hingeable with respect to the housing 3. In particular the spout 5 is hingedly connected to the collector 22, as can be seen in more detail in FIG. 4. The spout 5 is hingeable attached to the collector 22 and hinges about a hinge 23 which defines a substantial horizontal axis. Hence, the part of the spout 5 that protrudes from the housing 3 can be moved in a vertical direction and is hingeable with respect to the housing 3 when the juice extractor 1 is assembled. According to an aspect of the present invention, manipulation or movement of the spout 5 of the kitchen appliance or juice extractor 1 can be achieved by an interaction of the spout 5 of the juice extractor 1 and the pouring spout 9 of the juice jug 2. This interaction is shown in more detail with reference to FIGS. 3A and 3B.

Figure 3A:
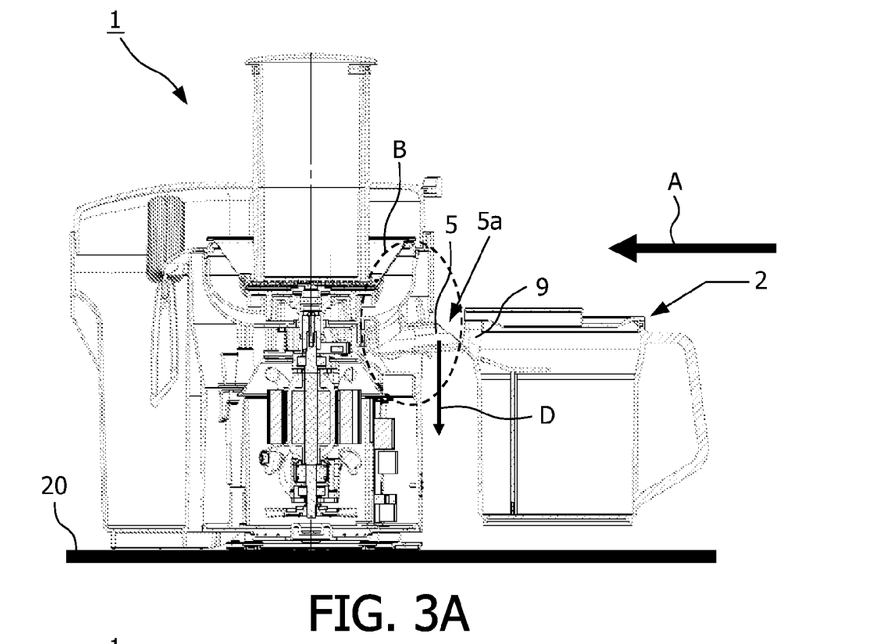
FIG. 3A shows the juice extractor and juice jug during movement of the juice jug.
Figure 3B:
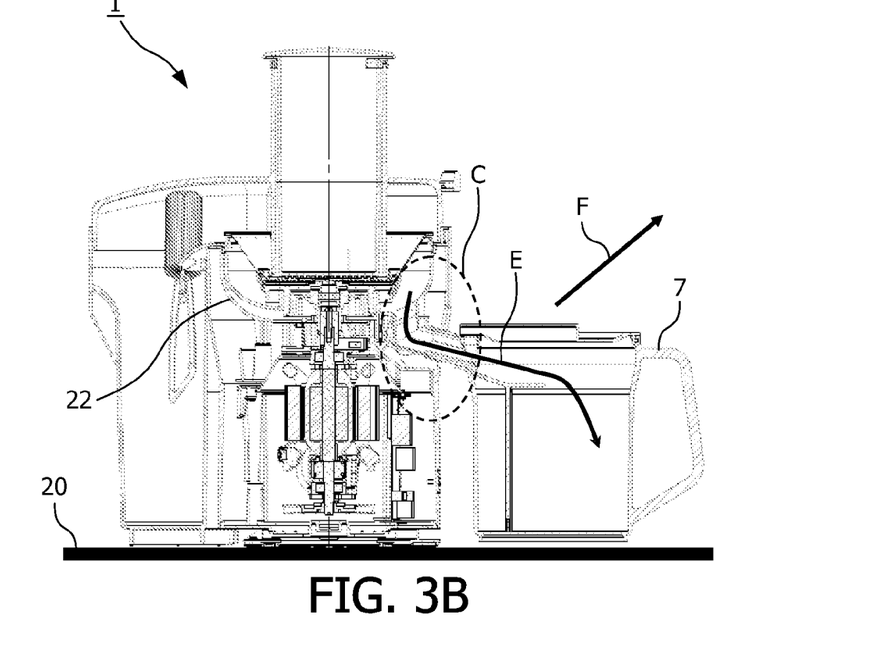
FIG. 3B shows the juice extractor and juice jug in co-operation.
Figure 4:
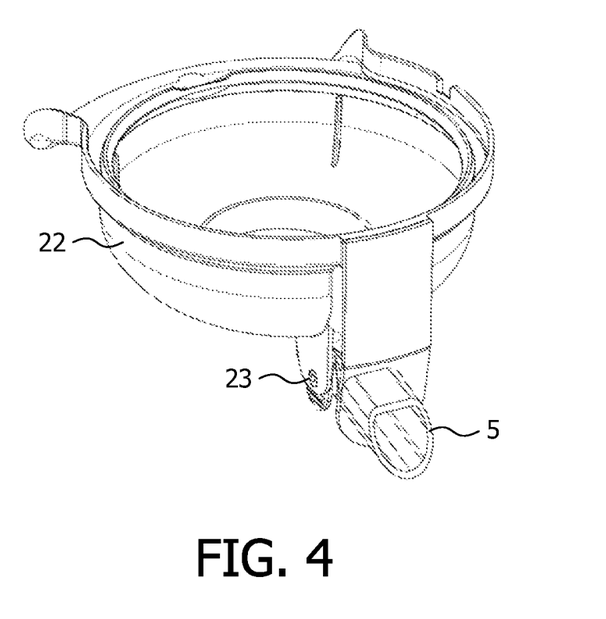
FIG. 4 shows a collector with a hinged spout.
Figure 5A:
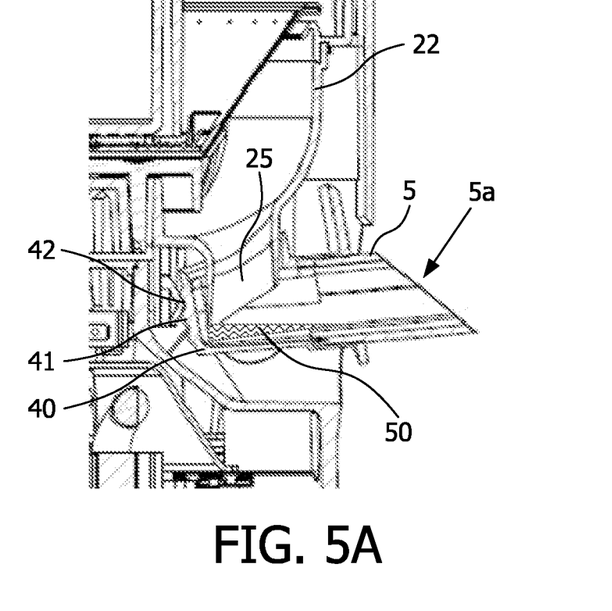
FIG. 5A shows in detail the spout in a second position.
Figure 5B:
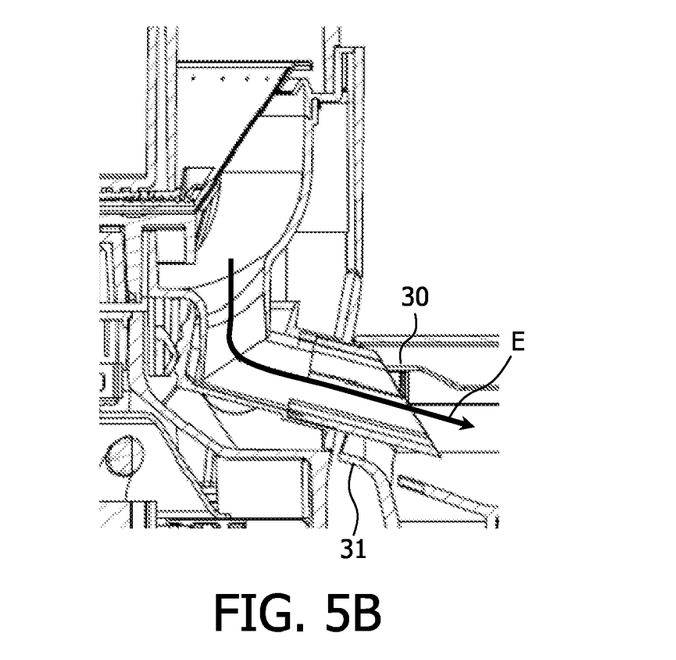
FIG. 5B shows in detail the spout in a first position.

A user who wants to use the juice extractor 1 brings the juice jug 2 from a position as shown in FIG. 2 in the direction of the juice extractor as is indicated with arrow A in FIG. 3A. The user displaces the juice jug 2 over the support surface 20 so as to bring the pouring spout 9 of the juice jug 2 into contact with the spout 5 of the juice extractor (kitchen appliance). The spout 5 is shaped as a tubular member and has a discharge opening 5a at that distal end thereof that extends from the housing 3. It is noted here that the spout 5 may also be shaped as a funnel, or a half-pipe shaped element. For the sake of clarity the area B in FIG. 3A is shown in more detail in FIG. 5A. Similarly the area C in FIG. 3B is shown in more detail in FIG. 5B, wherein FIG. 5A shows spout 5 above a horizontal line through said hinge and normal to the container and FIG. 5B shows spout 5 below the horizontal line.

In the position of the juice jug 2 in FIG. 3A the pouring spout 9 just touches the spout 5. As can be seen, the discharge opening or open distal end 5a of the spout 5 has been provided with an angled surface. The pouring spout 9 is provided with an inner profiled surface which comprises an upper guide surface 30 for contacting the open distal end 5a of the spout 5 of the juice extractor 1, and a lower guide surface 31 for contacting a lower part of the spout 5 of the juice extractor 1. The upper guide surface 30 is arranged to co-operate with the open distal end 5a of the spout 5. In particular due to the shape of the upper guide surface 30 and the angled distal end 5a any further movement of the juice jug 2 in the direction of arrow A will urge the spout 5 to move in a downward direction indicated with arrow D, i.e. the spout 5 of the juice extractor 1 will rotate or hinge about the hinge 23. This is depicted in FIGS. 3B and 5B respectively. In other words, the spout 5 of the juice extractor 1 is manipulated by the pouring spout 9 of the jug 2 which acts as a manipulator for the spout 5 of the juice extractor 1.

When the juice jug 2 has been fully moved toward the juice extractor 1 its spout 5 will extend, at least partially, into the pouring spout 9 of the juice jug 2. In this situation the spout 5 is angled downward and has an angle of about fifteen degrees with the horizontal. However, any angle between five and twenty-five degrees is conceivable. As the spout 5 will only start its rotational movement when part thereof already extends into the pouring spout 9 (see FIG. 3A), there is no risk that any juice flowing through the spout 5 from the collector 22, indicated by means of arrow E, will drip onto the support surface 20. The position of the spout 5 in FIGS. 3B and 5B is a first position of the spout 5. When the user wants to remove the juice jug 2 or when the collector 22 is empty, the juice jug 2 can be removed from its position as shown in FIG. 3B. This will be done by gripping the juice jug 2 by its handle 7 and to lift and pull the juice jug 2 away from the juice extractor. This is indicated by means of arrow F. While the juice jug 2 is moved in the direction of arrow F, the lower guide surface 31 of the pouring spout 9 will contact the lower or bottom part of the spout 5 and urge it upwards in a second position in which flow of juice is prevented. Hence, again the pouring spout 9 acts as a manipulator for the spout 5 of the juice extractor 1.

When the juice jug 2 has been removed, the spout 5 will assume its second position as shown in FIG. 2 for example. While removing the juice jug 2 the spout 5 is moved upward which ensures that any residual juice that may still be present in the spout 5 will flow back towards a closed distal end 40 of the spout 5. Furthermore, any residual juice that may be present in either the collector 22 or in the outlet 25 will be prevented to flow out of the spout 5 and onto the support surface 20. In particular the spout 5 will have an angle of about five degrees when in its second position which allows for some collection of juice near the closed distal end 40, i.e. the spout 5 defines a reservoir for excess juice in its second position. This is indicated in FIG. 5A in which a small amount of juice 50 can be seen to be present in the spout 5 of the juice extractor 1. It is noted that any angle between three and fifteen degrees is conceivable.

It is convenient when the, at least, two positions of the spout 5 are well defined. For that reason it is possible to provide the juice extractor 1 according to the invention with a locking arrangement that defines such positions. As can be seen in FIGS. 5A and 5B such locking arrangement may be comprised of a profiled or undulated surface 41 provided on the closed distal end 40 of the spout 5 that co-operates with a leaf spring member 42 provided on the collector 22. It may also be convenient to provide alternative means that act as a manipulator for the spout 5 of the juice extractor 1 and are arranged to urge the spout 5 toward its second position (the position of FIG. 2), so as to ensure that the spout 5 is always in a no-flow position in case no juice jug is present. Such alternative manipulators may come in the form of resilient members such as springs or magnets that act upon the spout 5, or may be in the form of a counter-weight that, under the influence of gravity, hinges the spout 5 towards its second position if it is released.

It is noted here that the present invention is particularly beneficial when used with a juice jug that is specifically adapted to be used with the juice extractor as described. However, the spout 5 may also be manipulated directly by a user using his hands. Hence, a user may push the spout 5 downward if he wants to pour juice, or push the spout upward in case he is finished. The provision of the above-mentioned manipulators is in particular beneficial in such a case as the user can just let go of the spout so as to put it in its second (no-flow) position. Such actuator means may, as mentioned, for example comprise a magnet, a spring or a combination of both. Other solutions are also possible.

As a safety arrangement it may be foreseen to provide an additional power switch that is operated by the spout of the juice extractor. In particular, it may be foreseen that the spout disables operation of the juice extractor, i.e. the electric motor, when the spout is in its second position.

The invention has been described in relation to a juice extractor. It is to be understood however that the invention is not limited to the examples given, but that these examples are only given to exemplify certain embodiments of the invention. In particular it is noted that the invention has been described in the example of a juice extractor. It is emphasized again that the invention is not limited nor intended to be limited to such a juice extractor, but is equally applicable to other kitchen appliances such as blenders, mixers and the like and even to coffee making machines and general purpose water dispensers for example. In other words, the invention is applicable to kitchen appliances that are arranged to process foodstuff and can supply pourable foodstuff, such a juice from fruit and/or vegetables, milkshakes etcetera. In other words, foodstuff that has a certain amount of liquidity.

Further, it is also conceivable to toggle movement of the spout of the juice extractor in an alternative manner as described above. It is for example also possible to provide the spout of the juice extractor with a magnet and provide the pouring spout of the jug with a iron insert (or make the spout or the whole jug out of iron), such that when the jug is in the vicinity of the juice extractor, movement of its spout is effected.

While the subject-matter has been illustrated in the drawings and the foregoing description, such illustration and description are to be considered illustrative or exemplary and not restrictive; the subject-matter is not limited to the disclosed embodiments. Other variations to the disclosed embodiments can be understood and effected by those skilled in the art of practicing the claimed subject-matter, from a study of the drawings, the disclosure and the appended claims. Use of the verb "comprise" and its conjugations does not exclude the presence of other elements other than those stated in a claim or in the description. Use of the indefinite article "a" or "an" preceding an element or step does not exclude the presence of a plurality of such elements or steps. The Figures and description are to be regarded as illustrative only and do not limit the subject-matter. Any reference sign in the claims should not be construed as limiting the scope.

The invention claimed is:

1. A kitchen appliance for processing foodstuff comprising:
   a housing surrounding a cavity receiving said foodstuff;
   an outlet dispensing pourable foodstuff from the housing;
   a collector to receive and collect pourable foodstuff and deliver the pourable foodstuff to the outlet, the outlet being provided with a spout, said spout comprising:
   a first distal end connected at a hinge attached to said container, and
   a second distal end opposite to said first distal end and extending from said housing, said spout being movable between a first position, directed below a horizontal axis through said hinge normal to said housing, in which the pourable foodstuff can be dispensed from the spout, and a second position, directed above said horizontal axis, in which dispensing of the pourable foodstuff from the spout is prevented, wherein
   a reservoir is formed at said first distal end of said spout to hold excess pourable foodstuff when said spout is in said second position; and
   said second distal end of said spout is configured to direct said spout into said first position; and
   a locking arrangement for locking the spout of the kitchen appliance in one of said first position and said second position, wherein the locking arrangement comprises a profiled surface provided on the first distal end and a flexible leaf spring member arranged to co-operate with said profiled surface.

2. The kitchen appliance according to claim 1, further comprising:
   means for retaining said spout in said second position, said means comprising one of: a spring, a counter-weight and a magnet.

3. The kitchen appliance-according to claim 1, wherein said spout is arranged to be, at least partially, inserted into a pouring spout of a jug.

4. The kitchen appliance according to claim 3, wherein said pouring spout comprises:
   a lower guide said lower guide surface arranged to contact the spout of the kitchen appliance and to urge said spout into said second position upon extraction of the spout from the pouring spout.

5. The kitchen appliance according to claim 3, wherein said pouring spout comprises an upper guide surface, said upper guide surface arranged to contact the spout of the kitchen appliance-to urge said spout into said first position when the spout is inserted-into the pouring spout of the jug.

6. The kitchen appliance according to claim 1, wherein the spout is angled downward with respect to the horizontal axis between 5 and 25 degrees in said first position, and is angled upward with respect to the horizontal axis between 3 and 15 degrees in said second position.

7. The kitchen appliance according to claim 1, wherein the first distal end extends, at least partly, into the housing and is arranged to receive pourable foodstuff from the outlet, and said second distal end protrudes from the housing.

8. The kitchen appliance according to claim 1, further comprising:
   an electric drive motor, and
   an electric switch, said switch being arranged to disable operation of the kitchen appliance when said spout is in said second position.

* * * * *